(12) United States Patent
Marlor

(10) Patent No.: US 6,284,686 B1
(45) Date of Patent: Sep. 4, 2001

(54) LEAD AND ARSENIC FREE BOROSILICATE GLASS AND LAMP CONTAINING SAME

(75) Inventor: Richard C. Marlor, Beverly, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/470,535

(22) Filed: Dec. 22, 1999

Related U.S. Application Data

(63) Continuation of application No. 09/085,989, filed on May 28, 1998, now Pat. No. 6,118,216.
(60) Provisional application No. 60/047,372, filed on Jun. 2, 1997.

(51) Int. Cl.[7] ............................. C03C 3/095; H01J 61/30
(52) U.S. Cl. ................. 501/64; 501/66; 501/68; 501/69; 501/70; 313/636; 313/25
(58) Field of Search ................. 501/64, 66, 68, 501/69, 70, 72; 313/112, 493, 623, 636, 25

(56) References Cited

U.S. PATENT DOCUMENTS

| | | | |
|---|---|---|---|
| 3,531,677 | 9/1970 | Loughridge | 313/636 |
| 3,984,252 | 10/1976 | Kiefer | 106/54 |
| 4,806,268 | 2/1989 | Kiss et al. | 501/60 |
| 4,925,814 | 5/1990 | Fine | 501/66 |
| 5,182,237 | 1/1993 | Brix | 501/66 |
| 5,557,171 | 9/1996 | Marlor et al. | 313/636 |
| 5,599,753 | 2/1997 | Watzke et al. | 501/66 |
| 5,849,649 | 12/1998 | Poole | 501/67 |
| 5,885,915 | * 3/1999 | Bako et al. | 501/66 |
| 6,118,216 | * 9/2000 | Marlor | 313/636 |

FOREIGN PATENT DOCUMENTS

| | | |
|---|---|---|
| 0 588 000 A | 3/1994 | (EP) . |
| 0603933A1 | 6/1994 | (EP) . |
| 0699636A1 | 3/1996 | (EP) . |
| 0 735 007 A | 10/1996 | (EP) . |
| 0 749 150 A | 12/1996 | (EP) . |
| 06-056467 | * 3/1994 | (JP) . |
| 08-012369 | * 1/1996 | (JP) ........................ C03C/3/093 |

OTHER PUBLICATIONS

JP 08 012369, Patent Abstracts of Japan, vol. 96, No. 5, (May 31, 1996).
Abstract, RU 2035414 C (May 20, 1995).

* cited by examiner

*Primary Examiner*—David R Sample
(74) *Attorney, Agent, or Firm*—Robert F. Clark

(57) ABSTRACT

A lead and arsenic free borosilicate glass is provided which is suitable for use in electric arc discharge lamps. The glass is tungsten-sealing and provides desirable protection from ultraviolet radiation. In addition, the glass is suitable for use in glass melters not equipped with bubblers.

10 Claims, 3 Drawing Sheets

LEAD AND ARSENIC FREE BOROSILICATE GLASS AND LAMP CONTAINING SAME

CROSS-REFERENCE TO RELATED APPLICATION

This application is a continuation-in-part of application Ser. No. 09/085,989, filed May 28, 1998, now U.S. Pat. No. 6,118,216, which claims the benefit of U.S. Provisional Application No. 60/047,372, filed Jun. 2, 1997.

TECHNICAL FIELD

This invention relates to borosilicate glass compositions and lamps containing same. More particularly, it relates to ultraviolet (UV) absorbing, tungsten-sealing, borosilicate glass compositions for use in the manufacture of electric arc discharge lamps.

BACKGROUND ART

UV absorbing borosilicate glass compositions for electric arc discharge lamps such as high intensity discharge (HID) lamps, typically contain either lead and arsenic oxides or lead and cerium oxides. One conventional lead and arsenic containing borosilicate glass is SG772. SG772 has physical properties which enables it be used for both outer envelope and lamp stem applications. However, both lead and arsenic are toxic materials and it would be very advantageous to be able to manufacture acceptable glasses without using these materials. Arsenic oxide is generally employed in glass compositions as a fining agent for glasses which are difficult to fine (i.e., removal of bubbles). Ceria (>0.15 wt. %) has been used as an acceptable substitute for arsenic oxide for fining glasses, and providing UV absorption. However, ceria-containing borosilicate glasses will solarize under UV irradiation when lead oxide is not in the composition.

Solarization produces light absorbing color centers that darken the outer envelope and seriously reduce light output.

Lead and arsenic free borosilicate glass compositions have been developed to exclude these toxic components. One such lead and arsenic free borosilicate glass (designated SG773) is described in commonly assigned, copending U.S. application Ser. No. 09/085,989, filed May 5, 1998 which is incorporated herein by reference. SG773 glass is typically manufactured in a glass melter equipped with a bubbler system. Bubblers improve convection, and control the flow of glass through the melter. Large bubbles are introduced at the bottom of the melter which rise to the surface. The convective mixing which develops with bubbling brings cold bottom glass up to the melt surface for additional melting. This increases the average glass temperature and melting rate. Without bubbling, the radiative heat transfer in SG773 glass must be enhanced to make up for the decrease in convective mixing. Thus, it would be an advantage to make this glass more suitable for use in glass melters which are not equipped with bubblers.

SUMMARY OF THE INVENTION

It is an object of the invention to obviate the disadvantages of the prior art.

It is another object of the invention to provide a lead and arsenic free borosilicate glass for use in the outer envelopes and stems of electric discharge lamps.

It is still another object of the invention to provide a more suitable lead and arsenic free borosilicate glass composition for use in glass melters not equipped with bubblers.

In accordance with one object of the invention, there is provided a lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 2.0 weight percent CaO, 0 to 2.0 weight percent MgO, 0.04 to 0.17 weight percent $Fe_2O_3$, 0.005 to 0.12 weight percent $CeO_2$, 0.005 to 0.30 weight percent $TiO_2$, and the balance $SiO_2$, and wherein the sum of the amounts of $Fe_2O_3$ and $CeO_2$ comprise no greater than 0.19 weight percent, the sum of CaO and MgO comprise no greater than 2.0 weight percent, and the sum of the amounts of $Na_2O$, $K_2O$ and $Li_2O$ comprise no greater than 7.5 weight percent.

In accordance with another object of the invention, there is provided an electric arc discharge lamp having an arc discharge light source which emits both visible and ultraviolet radiation, the light source being enclosed within an outer envelope comprising a lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 2.0 weight percent CaO, 0 to 2.0 weight percent MgO, 0.04 to 0.17 weight percent $Fe_2O_3$, 0.005 to 0.12 weight percent $CeO_2$, 0.005 to 0.30 weight percent $TiO_2$, and the balance $SiO_2$, and wherein the sum of the amounts of $Fe_2O_3$ and $CeO_2$ comprise no greater than 0.19 weight percent, the sum of CaO and MgO comprise no greater than 2.0 weight percent, and the sum of the amounts of $Na_2O$, $K_2O$ and $Li_2O$ comprise no greater than 7.5 weight percent.

In accordance with still another object of the invention, the outer envelope and the stem of the electric discharge lamp are made of the same lead and arsenic free borosilicate glass.

DESCRIPTION OF THE PREFERRED EMBODIMENTS

Figure 1:
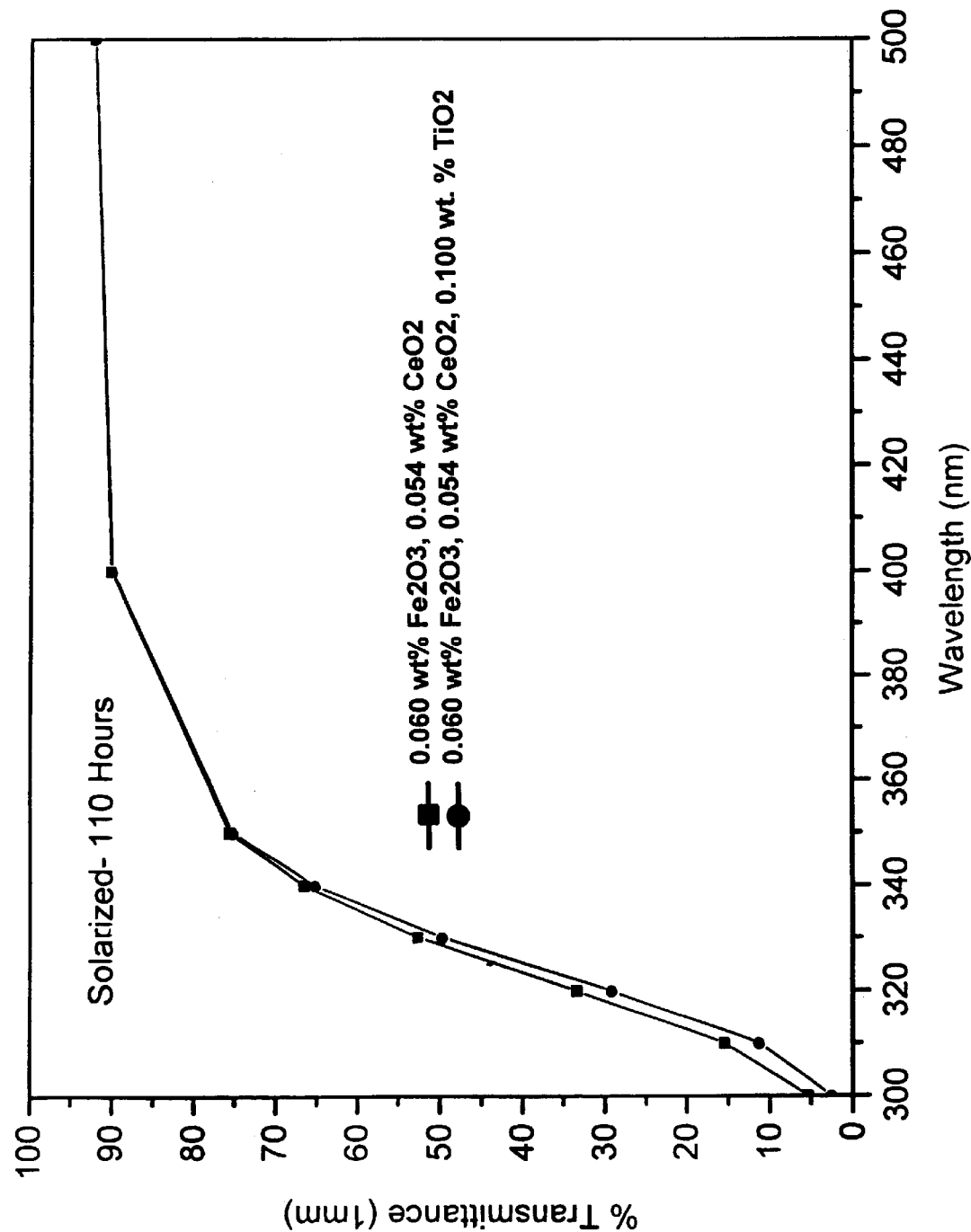
FIG. 1. is a comparison of the transmittance of two SG773 glass compositions (with and without titania) after 110 hours of solarization.

For a better understanding of the present invention, together with other and further objects, advantages and capabilities thereof, reference is made to the following disclosure and appended claims taken in conjunction with the above-described drawings.

A lead and arsenic free borosilicate glass has been developed which is suitable for use in electric arc discharge lamps. The glass is resistant to scum formation and significantly reduces (by about 40%) the amount of batched iron oxide required for UVB protection. The glass is also suitable for use in melters which are not equipped with bubblers and is tungsten sealing which makes it suitable for both outer envelope and stem sealing applications.

The glass of this invention is similar in composition to the glass described in copending U.S. application Ser. No. 09/085,989, filed May 28, 1998, now U.S. Pat. No. 6,118, 216 except that titania ($TiO_2$) has been added to improve radiative heat transfer in the glass melter. The added titania doesn't change the physical properties of the SG773 glass and allows the glass to be formulated with less iron oxide. This in turn reduces the amount of ferrous iron in the molten glass. Ferrous iron ($Fe^{2+}$) absorbs in the infrared which acts to limit radiative heat transfer in the molten glass. However, reducing the amount of iron is not without consequence. In contrast to the operational problems in the melter associated with ferrous iron, ferric iron ($Fe^{3+}$) is important for controlling and absorbing UVB radiation (260–320 nm). Ceria, a UVB absorber, may be increased in order to compensate for a lower iron content. However, increased ceria leads to lamp lumen loss because of solarization of the glass. For example, in copending U.S. application Ser. No. 09/085,989, filed May 28, 1998, now U.S. Pat. No. 6,118,216 ceria is limited to 0.06 wt. %. Since ceria must be limited because of solarization, titania was found to be an acceptable substitute. The addition of titania was also found to stabilize solarization which allowed for higher amounts of ceria to be present.

In particular, the glass of this invention contains 13.5 to 16.8 weight percent (wt. %) boron oxide ($B_2O_3$), 2.0 to 4.0 wt. % alumina ($Al_2O_3$), 2.0 to 5.0 wt. % sodium oxide ($Na_2O$), 1.3 to 4.0 wt. % potassium oxide ($K_2O$), 0 to 0.30 wt. % lithium oxide ($Li_2O$), 0 to 2.0 wt. % calcium oxide (CaO), 0 to 2.0 wt. % magnesium oxide (MgO), 0.04 to 0.17 wt. % iron oxide ($Fe_2O_3$), 0.005 to 0.12 wt. % ceria ($CeO_2$), 0.005 to 0.30 wt. % titania ($TiO_2$) and the balance silica ($SiO_2$). The composition is further defined in that the sum of the amounts of iron oxide and ceria is no greater than 0.19 wt. %, the sum of calcium oxide and magnesium oxide is no greater than 2.0 wt.%, and the sum of the amounts of sodium oxide, potassium oxide and lithium oxide is no greater than 7.5 wt. %. A high $K_2O/Na_2O$ mole ratio (about 0.60) is preferred to maximize electrical resistivity for lamp stem applications. The amount of titania must be limited because of absorption in the visible spectrum. Although more expensive, BaO and SrO may be used as effective substitutes for MgO and CaO. In a more preferred embodiment, the glass contains about 0.060 wt. % iron oxide, about 0.075 wt. % ceria, and about 0.100 wt. % titania.

The alumina content of the glass, 2.0 to 4.0 wt. %, is at least 40% greater than the glass disclosed in U.S. Pat. No. 5,557,171 to Marlor et al. As the glass composition approaches the 16.8 wt. % $B_2O_3$ and 2.0 wt. % $Al_2O_3$ limits, tendencies towards increased melt volatilization and phase separation begin to appear. The surface scum formation problem associated with that prior art glass is believed to have been caused by the high level of $BO_3$ structural units associated with the higher boron composition. It is further believed that these $BO_3$ structures are unstable at higher temperatures and as a result the surface glass composition formed during melting is prone to phase separation. The addition of alumina for boron oxide is believed to have tightened the glass network resulting in a more stable structure consisting almost entirely of $BO_4$ tetrahedrons.

Table 1 compares a preferred composition of the glass of this invention, designated SG773, with several prior art glasses: SG772, Schott 8486, Schott 8487 and AS-16 (U.S. Pat. No. 5,557,171). The physical properties of the SG773 composition are compared with other tungsten-sealing glasses in Table 2.

TABLE 1

| Oxides | SG772 (wt. %) | Schott 8486 (wt. %) | Schott 8487 (wt. %) | AS-16 (wt. %) | SG773 (wt. %) |
|---|---|---|---|---|---|
| $SiO_2$ | 74.0 | 76.1 | 75.9 | 75.0 | 75.16 |
| $Na_2O$ | 3.3 | 3.9 | 3.8 | 3.9 | 2.9 |
| $K_2O$ | — | 1.3 | 1.5 | 1.5 | 2.6 |
| $Li_2O$ | 0.15 | — | — | 0.15 | 0.20 |
| $B_2O_3$ | 14.9 | 11.0 | 16.9 | 17.0 | 14.9 |
| $Al_2O_3$ | 1.4 | 3.6 | 1.4 | 1.4 | 3.0 |
| CaO | — | 1.2 | 0.1 | 0.6 | 0.6 |
| MgO | — | 0.4 | 0.4 | 0.4 | 0.4 |
| $Fe_2O_3$ | 0.04 | 0.08 | 0.03 | 0.13 | 0.06 |
| $CeO_2$ | — | — | — | — | 0.075 |
| BaO | — | 2.4 | — | — | — |
| PbO | 5.5 | — | — | — | — |
| $As_2O_3$ | 0.7 | — | — | — | — |
| $TiO_2$ | — | — | — | — | 0.10 |

TABLE 2

| | SG772 | Schott 8487 | SG773 |
|---|---|---|---|
| Thermal Expansion, 0–300° C. ($\times 10^{-7}$ in/in/° C.) | 35.8 | 38.0 | 39.0 |
| Tungsten Seals (psi, tension) | | | |
| Radial Stress (tension) | 745 | 730 | 495 |
| Axial Stress (tension) | 176 | 68 | 44 |
| Electrical Resistivity | | | |
| Log (ohm-cm) @250° C. | 8.8 | 8.3 | 8.8 |
| Log (ohm-cm) @350° C. | 7.2 | 6.9 | 7.2 |
| Viscosity (log poise) | | | |
| 2.5 | 1567° C. | 1517° C. | 1599° C. |
| 4.0 (working point) | 1159° C. | 1135° C. | 1181° C. |
| 7.6 (softening point) | 755° C. | 774° C. | 771° C. |
| $T_{4.0}$–$T_{7.6}$ (working range) | 404° C. | 361° C. | 410° C. |
| Annealing Point | 523° C. | 542° C. | 542° C. |

The data in Table 2 demonstrates that the borosilicate glass of this invention, SG773, exhibits tungsten sealing properties comparable to the other tungsten-sealing glasses, SG772 and Schott 8487. SG773 high temperature viscosity is slightly higher than SG772, as is the annealing point. This viscosity relationship requires slightly higher temperatures for glass working, however since the annealing point is also slightly higher annealing fires used in high speed lamp manufacturing processes need not be relocated or reset. Moreover, since the glass does not contain lead or arsenic, it does not blacken like SG772 during sealing.

Figure 2:
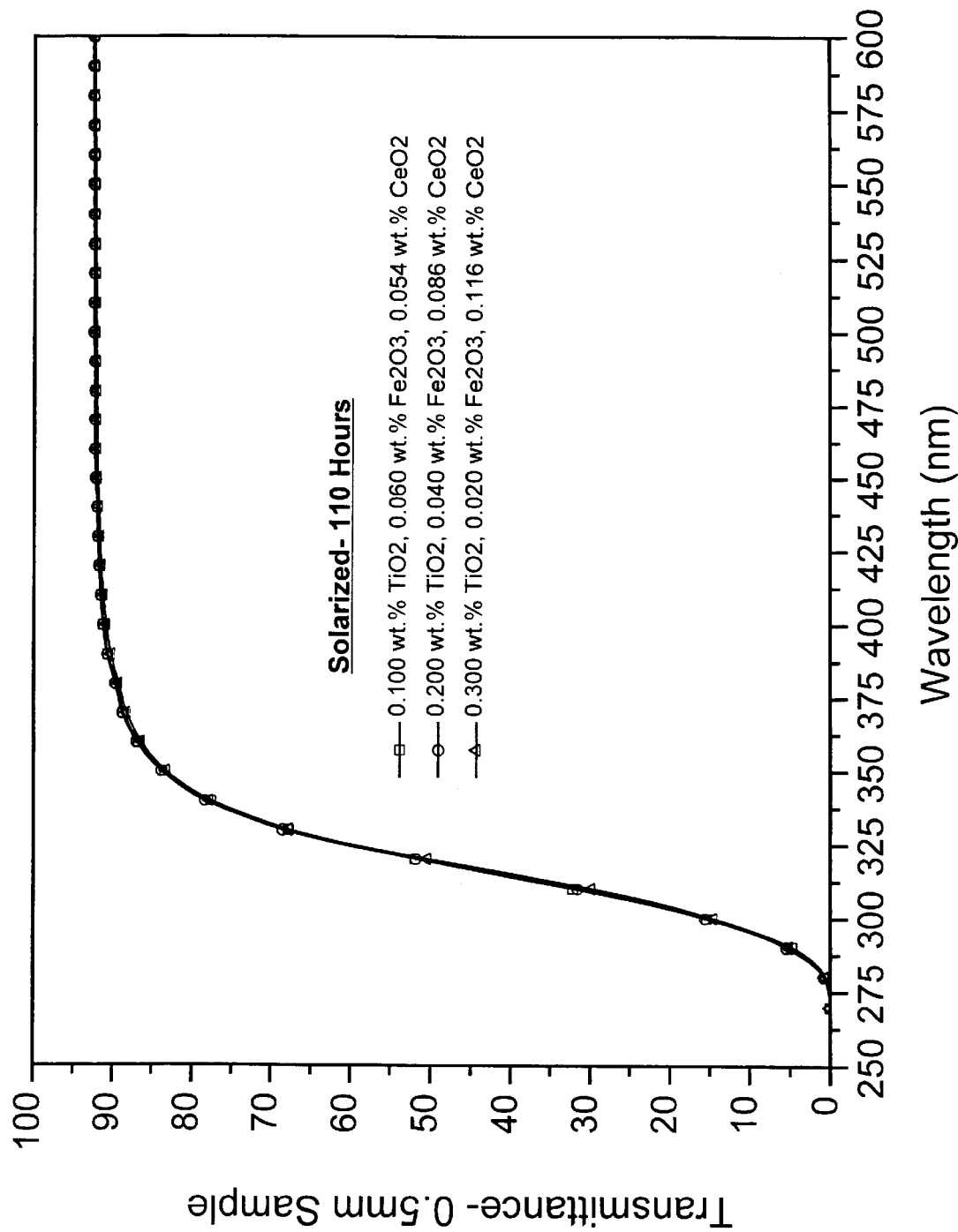
FIG. 2 is a comparison of the transmittance of three SG773 glasses of this invention after 110 hours of solarization.

FIG. 1 compares the transmittance curves for two SG773 compositions, one with and one without titania, after 110 hours of solarization (110 hours of UV irradiation by a 450 W iron iodide metal halide lamp located 3 inches from the glass). The transmittance of the SG773 glass formulated with titania after 110 hours is equivalent to that of the glass formulated without titania. FIG. 2 compares three SG773 compositions of this invention having increasing amounts of titania and ceria and decreasing amounts of iron oxide. The overlapping curves demonstrate the ability of the titania to control solarization and allow the amount of ceria to be increased above 0.06 wt. %.

Figure 3:
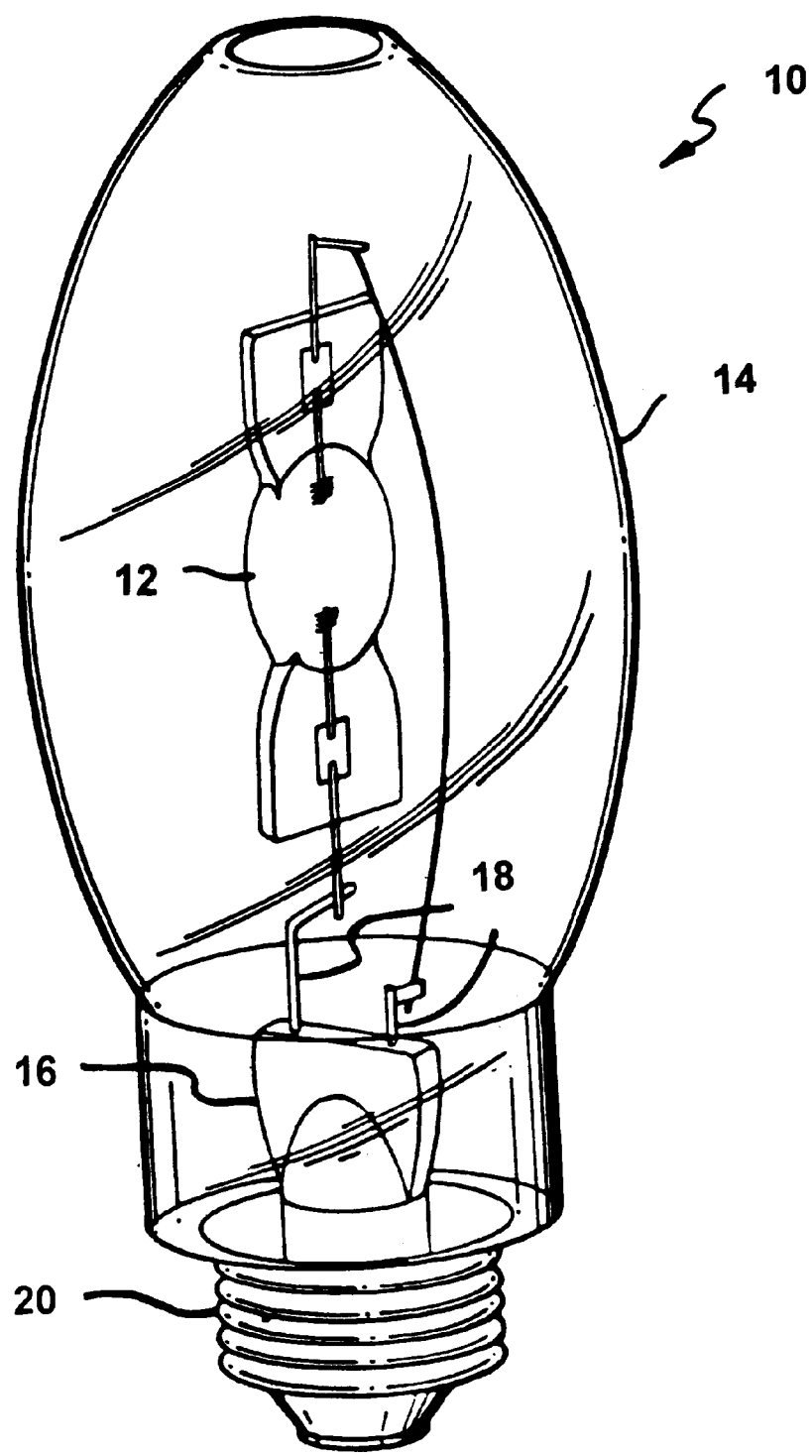
FIG. 3. is a diagrammatic, perspective view of an electric arc discharge lamp.

FIG. 3 illustrates an embodiment of the invention wherein an electric arc discharge lamp 10 has an arc tube 12 enclosed within a borosilicate glass outer envelope 14. The stem 16 is made of a tungsten-sealing borosilicate glass and is sealed at its periphery to the outer envelope 14. Preferably, the outer envelope 14 and the stem 16 are made of the same borosilicate glass in order to reduce manufacturing costs. Lead wires 18 are sealed in stem 16 and are electrically connected to arc tube 12 and base 20. When the lamp is operated, electrical energy is transmitted from the base 20 through lead wires 18 in stem 16 to arc tube 12. The arc tube 12, when operating, emits visible and ultraviolet radiation.

While there has been shown and described what are at the present considered the preferred embodiments of the invention, it will be obvious to those skilled in the art that various changes and modifications may be made therein without departing from the scope of the invention as defined by the appended claims.

I claim:

1. A lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 2.0 weight percent CaO, 0 to 2.0 weight percent MgO, 0.04 to 0.17 weight percent $Fe_2O_3$, 0.005 to 0.12 weight percent $CeO_2$, 0.005 to 0.30 weight percent $TiO_2$, and the balance $SiO_2$, and wherein the sum of the amounts of $Fe_2O_3$ and $CeO_2$ comprise no greater than 0.19 weight percent, the sum of CaO and MgO comprise no greater than 2.0 weight percent, and the sum of the amounts of $Na_2O$, $K_2O$ and $Li_2O$ comprise no greater than 7.5 weight percent.

2. A glass according to claim 1 wherein the composition contains about 0.075 weight percent $CeO_2$, about 0.060 weight percent $Fe_2O_3$, and about 0.100 weight percent $TiO_2$.

3. A glass according to claim 1 wherein the mole ratio of $K_2O$ to $Na_2O$ is about 0.60.

4. A glass according to claim 1 wherein the glass has a thermal expansion between 0 and 300° C. of $39.0 \times 10^{-7}$ in/in/° C. and a log electrical resistivity of 8.8 ohm-cm at 250° C.

5. A glass according to claim 1 wherein BaO or SrO is at least partially substituted for MgO or CaO.

6. An electric arc discharge lamp having an arc discharge light source which emits both visible and ultraviolet radiation, the light source being enclosed within an outer envelope comprising a lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 2.0 weight percent CaO, 0 to 2.0 weight percent MgO, 0.04 to 0.17 weight percent $Fe_2O_3$, 0.005 to 0.12 weight percent $CeO_2$, 0.005 to 0.30 weight percent $TiO_2$, and the balance $SiO_2$, and wherein the sum of the amounts of $Fe_2O_3$ and $CeO_2$ comprise no greater than 0.19 weight percent, the sum of CaO and MgO comprise no greater than 2.0 weight percent, and the sum of the amounts of $Na_2O$, $K_2O$ and $Li_2O$ comprise no greater than 7.5 weight percent.

7. An electric arc discharge lamp according to claim 6 wherein the lamp further comprises a stem which is sealed to the outer envelope and is comprised of the borosilicate glass.

8. An electric arc discharge lamp according to claim 7 wherein the glass has a thermal expansion between 0 and 300° C. of $39.0 \times 10^{-7}$ in/in/° C. and a log electrical resistivity of 8.8 ohm-cm at 250° C.

9. An electric arc discharge lamp according to claim 6 wherein the glass contains about 0.075 weight percent $CeO_2$, about 0.060 weight percent $Fe_2O_3$, and about 0.100 weight percent $TiO_2$.

10. An electric arc discharge lamp according to claim 6 wherein BaO or SrO is at least partially substituted for MgO or CaO.

* * * * *